United States Patent [19]
Yeats et al.

[11] Patent Number: 4,746,739
[45] Date of Patent: May 24, 1988

[54] DISPERSANTS

[75] Inventors: Keith Yeats, Cramlington; Ian D. Eeles, Washington; Graham C. Battersby, Macclesfield, all of United Kingdom

[73] Assignee: International Paint public limited company, United Kingdom

[21] Appl. No.: 893,549

[22] Filed: Jul. 11, 1986

[30] Foreign Application Priority Data

Nov. 23, 1984 [GB] United Kingdom ................ 8429686

[51] Int. Cl.$^4$ .......................................... C07D 251/00
[52] U.S. Cl. .................... 544/222; 544/221; 528/327
[58] Field of Search ................ 528/327; 544/221, 222

[56] References Cited

U.S. PATENT DOCUMENTS

| | | | |
|---|---|---|---|
| 3,547,918 | 12/1970 | Porret et al. | 544/221 |
| 3,940,353 | 2/1976 | Martorano. | |
| 4,376,120 | 3/1983 | Zeidler et al. | 544/221 |
| 4,550,154 | 10/1985 | Kordomenos | 528/73 |
| 4,626,578 | 12/1986 | Kordomenos | 525/514 |

FOREIGN PATENT DOCUMENTS

| | | | |
|---|---|---|---|
| 0052800 | 6/1982 | European Pat. Off. | 544/221 |
| 49-48320 | 12/1974 | Japan | 544/221 |
| 50-160287 | 12/1975 | Japan | 544/221 |
| 60-112775 | 6/1985 | Japan | 544/221 |
| 1108261 | 4/1968 | United Kingdom. | |
| 1339930 | 12/1973 | United Kingdom. | |
| 1343606 | 1/1974 | United Kingdom. | |
| 1346298 | 2/1974 | United Kingdom. | |
| 1373660 | 11/1974 | United Kingdom. | |
| 1393401 | 5/1975 | United Kingdom. | |
| 1439479 | 6/1976 | United Kingdom. | |
| 1441407 | 6/1976 | United Kingdom. | |
| 1445135 | 8/1976 | United Kingdom. | |

OTHER PUBLICATIONS

Derwent Abstract, 85-226773 and CA. 104-52208j.

Primary Examiner—Joseph L. Schofer
Assistant Examiner—N. Sarofim
Attorney, Agent, or Firm—Steele, Gould & Fried

[57] ABSTRACT

A pigment dispersant is derived from a compound of molecular weight less than 600 which contains at least three functional groups, at least one of which is an epoxy group. Preferably the compound contains at least three epoxy groups, for example triglycidyl isocyanurate. The core radical derived from the said compound is bonded to more than one solvent-compatible organic radical of molecular weight at least 200, the average molecular weight of the solvent-compatible radicals being at least 500, and to a pigment-compatible radical containing a polar group.

10 Claims, No Drawings

DISPERSANTS

TECHNICAL FIELD

This invention relates to dispersants, particularly pigment dispersants used in the preparation of paints and inks.

Dispersants aid in the dispersion of a pigment in a paint vehicle, that is, the film-forming resin and solvent of the paint. The pigment and vehicle are generally ground or milled together and the dispersant reduces the time needed to disperse the pigment in the vehicle and increases the degree of dispersion leading to higher opacity and colour value and improved gloss.

BACKGROUND ART

Examples of pigment dispersants are described in British Pat. Nos. 1108261, 1339930, 1346298, 1373660 and 1393401 and in U.S. Pat. No. 3940353. Such pigment dispersants are generally compounds containing a solvent-compatible organic radical of molecular weight at least 500 and a polar pigment-compatible radical.

Pigments dispersants can also be used to prepare dispersions of pigments in a solvent which can be mixed into different types of paints without requiring subsequent grinding or milling of the paint. Such pre-dispersions can be used to supply paint quickly without needing to keep stocks of many types of paint each in many colours. There is a need for a pigment dispersant which can be used in this way with a wide variety of film-forming resins and solvents.

DISCLOSURE OF INVENTION

A pigment dispersant according to the invention containing in its molecule a solvent-compatible organic radical of molecular weight at least 500 and a pigment-compatible radical containing a polar group has a core radical derived from a compound of molecular weight less than 600 which contains at least three functional groups, at least one of which is an epoxy group, the core radical being bonded to more than one solvent-compatible organic radical of molecular weight at least 200, the average molecular weight of the solvent-compatible radicals being at least 500, and to a pigment-compatible radical containing a polar group.

A process according to the invention for preparing such a dispersant comprises reacting a compound Y of molecular weight less than 600 which contains at least three functional groups, at least one of which is an epoxy group, successively or simultaneously with at least one compound of the form R-X, where R is a solvent-compatible organic radical as defined above and X is a functional group capable of reacting with the compound Y, and with a compound of the form Z-X' where X is a pigment-compatible radical containing a polar group and X' is a functional group capable of reacting with the compound Y, the relative proportions of the compounds R-X and Z-X' being selected so that more than one solvent-compatible organic radical R is bonded to the compound Y.

Preferably Y is a trifunctional compound and reacts with the compound(s) R-X in a molar ratio of about 1:2 and with the compound Z-X' in a molar ratio of about 1:1. The trifunctional compound is preferably reacted first with the compound(s) R-X and subsequently with the compound Z-X'. For example it can be reacted with R-X in a molar ratio 1:1.5 to 1:2.5, and the proportion of the compound Z-X' used can be adjusted accordingly.

The product of the reaction is in any case generally a mixture; if the trifunctional compound is reacted with the compound(s) R-X at molar ratio 2:1 the major reaction product will contain two groups R bonded to the core radical but minor amounts of compounds containing one and three groups R bonded to the core radical will usually also be formed. The dispersant will accordingly contain minor amounts of compounds containing one solvent-compatible radical with two anchor group radicals and three solvent-compatible radicals with no anchor group radicals. Such reaction product mixtures can be used as dispersants according to the invention and may give as good or better dispersion than the pure compound.

The compound Y forming the core radical preferably contains at least three epoxy groups, for example three glycidyl groups. A particularly preferred trifunctional compound is triglycidyl isocyanurate. It can for example be bonded to the solvent-compatible radicals and the pigment-compatible radical by reaction with carboxyl, amine or hydroxyl groups in the compounds R-X and Z-X'.

The linkages formed by the reaction of epoxy groups with carboxyl, amine or hydroxyl groups have the advantage that a secondary hydroxyl group is generated. Where a curing agent is used in the paint, for example in stoved paints or two-pack ambient temperature curing paints, such a secondary hydroxyl may react with the curing agent, ensuring that the dispersant is bound into the cured paint film. The hydroxyl group can for example react with melamine derivatives, isocyanates or anhydrides. The hydroxyl group may also improve the ability of the dispersant to disperse organic pigments. The dispersants according to the invention formed from compounds containing epoxy groups may also improve the adhesion of paints containing them to substrates such as metal and previously applied coats of paint.

The core radical preferably contains an aromatic ring or a heterocyclic ring having some aromatic character, for example a pyridine, pyrimidine or pyrazine ring or a triazine ring, which can be in the form of melamine or isocyanuric acid or a derivative thereof.

The three functional groups in the compound forming the core radical need not all be the same, for example the compound may contain two epoxy groups with a carboxyl group. If the functional groups are reactive with different functional groups in the compounds R-X and Z-X', compounds having two solvent-compatible organic radicals and one anchor group radical can readily be prepared in a relatively pure state. If the compound Y contains other functional grops than epoxy it can be bonded to the solvent-compatible radical or to the pigment-compatible radical by ester, ether, amide, amine or urethane linkages, which can for example be formed by the reaction of anhydride groups with hydroxyl or amine groups or by the reaction of hydroxyl groups with isocyanate groups, or by quaternary salt formation, for example by reacting a benzyl chloride group with a tertiary amine group.

The solvent-compatible organic radicals R can be the same or different. The radicals R generally improve the compatibility of the dispersant with film-forming resins as well as with organic solvents, particularly hydrocarbon solvents, used in paints. At least one of the radicals R preferably contains at least one hydrocarbon chain of at least ten carbon atoms. One example of a preferred radical R is a polyester of molecular weight 1000–3000. Such a polyester can for example be carboxy-functional for reaction with a trivalent epoxy functional compound such as triglycidyl isocyanurate. The carboxy-functional polyester may be formed from a dicarboxylic acid or anhydride having at least 10 carbon atoms with a diol, or from a diol having at least 10 carbon atoms with a dicarboxylic acid or an anhydride, but is preferably formed by polymerisation of a hydroxy-substituted carboxylic acid having at least 10 carbon atoms. The polyester-forming reagents preferably include a minor proportion of a monofunctional material.

Where the polyester is formed from a hydroxy-substituted carboxylic acid, a monofunctional acid is preferably used to produce a polyester containing a carboxyl end group or a monofunctional hydroxyl compound to produce a polyester containing a hydroxyl end group. The hydroxyl group in the carboxylic acid is preferably not in the omega position, so that the polyester has hydrocarbon side chains which aid the compatibility of the dispersant with hydrocarbon solvents. One preferred long-chain hydroxy-substituted carboxylic acid is 12-hydroxy-stearic acid, which is commercially available containing a minor proportion of stearic acid. An alternative long chain hydroxy-substituted carboxylic acid is ricinoleic acid. Dispersants containing poly(12-hydroxystearic acid) radicals, particularly those with a core radical derived from triglycidyl isocyaurate, are very effective in forming dispersions containing a high proportion of pigment with a low proportion of dispersant.

Alternative solvent-compatible polyester radicals can be prepared by the reaction of a diol, for example neopentyl glycol, propylene glycol or ethylene glycol, with a dicarboxylic acid containing a long hydrocarbon chain, for example a fatty acid dimer. Carboxyl-terminated polyesters can be produced by the inclusion of a small proportion of monofunctional alcohol and hydroxy-terminated polyesters by the inclusion of a small proportion of monocarboxylic acid.

An alternative solvent-compatible polyester is polycaprolactone, which is commercially available as a hydroxy-tipped polymer. It can be used as such or can be reacted with an equimolar amount of an anhydride, for example phthalic anhydride, to provide a carboxyl-tipped polyester for reaction with a core radical having epoxy groups.

Alternative radicals R are derived from polyethers of molecular weight 600 to 2500, preferably about 1000, particularly tetrahydrofuran polymers (polytetramethylene glycol) which are commercially available having hydroxyl end groups. The polyether can be reacted with an appropriate difunctional reagent to introduce carboxyl or amine end groups for reaction with the trifunctional compound forming the core radical. Such polyether radicals R may be particularly valuable in forming a dispersant having good compatibility with epoxy and polyurethane film-forming resins.

Acrylic polymers of similar molecular weight can alternatively be used. These can contain a functional group such as carboxyl, hydroxy, epoxide, anhydride, isocyanate or amine in pendent groups or may be tipped by such a group, for example they may be carboxyl-tipped. Carboxyl-tipped acrylic polymers can be made by free radical polymerisation using an acid-functional initiator, for example azobis(cyanovaleric acid) and an acid-functional chain transfer agent, for example mercaptoacetic acid. The molecular weight of the acrylic polymer radical is preferably 800–6000, particularly 1000–4000. The acrylic polymer radical may include one or more pendent long-chain hydrocarbon groups having 8 or more carbon atoms, for example a stearyl, oleyl, lauryl, n-octyl or 2-ethylhexyl group introduced by polymerisation of stearyl, oleyl, lauryl, n-octyl or 2-ethylhexyl methacrylate or acrylate, or it may include one or more pendent alicyclic groups, for example a bicyclic group such as an isobornyl group introduced by polymerisation of isobornyl acrylate or methacrylate. Acrylic polymer radicals R containing such alicyclic groups are particularly valuable in forming dispersants compatible with a wide range of film-forming resins. The polymer radical can for example be derived from a copolymer of 25–75 weight percent isobornyl acrylate or methacrylate with 25–75 percent of a lower alkyl acrylate or methacrylate such as methyl methacrylate or isobutyl methacrylate.

One of the radicals R can be a simple long-chain aliphatic radical derived from a fatty acid or alcohol; for example a stearoyl or oleoyl group can be introduced by reaction of stearic or oleic acid with an epoxide group in the trivalent compound. One or both of the radicals R can alternatively be derived from a dimer acid derived from an unsaturated fatty acid or a reactive polyamide produced therefrom. The use of an unsaturated fatty acid, such as a drying oil fatty acid derived from soya, tall oil or linseed oil, or ricinoleic acid, or a dimerised unsaturated fatty acid, either as one of the radicals R or as part of a polymer forming one or both radicals R, may give paints of improved properties. The adhesion of paints, particularly heat-cured paints, containing such an unsaturated dispersant to substrates, particularly metal, may be improved and the paints may have increased hardness.

Examples of dispersants containing different radicals R are the reaction products of a trifunctional core radical such as triglycidyl isocyanurate with poly(12-hydroxystearic acid) and with a carboxy-functional polyether formed by the reaction of equimolar amounts of polytetramethylene glycol and phthalic anhydride, or with one of the above solvent-compatible radicals, particularly poly(12-hydroxystearic acid) and a carboxy-functional isobornyl methacrylate or acrylate copolymer.

Examples of polar groups which can be included in the pigment-compatible radical include nitrogen-containing groups such as amino, nitro, amide, urea, nitrile or amine oxide groups and acid groups such as carboxylic or sulphonic acid groups which may be in acid or salt form. Preferred polar groups include amino groups, carboxylic acid groups in free acid form or as a salt with an alkali metal or amine, and nitro groups. The polar groups are preferably attached to an aromatic ring or to a heterocyclic ring having aromatic character. Amino groups have the advantage that they can react with many curing agents used in paints so that the dispersant is bound into the cured paint film.

The pigment-compatible radical Z can for example be derived from a primary or secondary amine containing a carboxylic acid group in its molecule, for example p-aminobenzoic acid. Such an amine-substituted acid can react with the trivalent compound forming the core radical either through its amine group, for example by reaction with an epoxide group, or through its carboxylic acid group to form an ester linkage. An amine-substituted sulphonic acid, e.g. taurine, can be reacted through its amine group. Alternatively a dicarboxylic acid can be reacted in proportions such that one acid group forms an ester linkage with the core radical and the other remains as a free carboxylic acid, which can be converted if desired into a salt, for example an ammonium, amine or quaternary ammonium salt, or an amide. A nitro-substituted aromatic carboxylic acid, for example p-nitrobenzoic acid or 3,5-dinitrobenzoic acid, is an alternative reagent for forming the anchor group radical by reaction of the acid to form an ester linkage. A diamine can be used to form the pigment-compatible radical for example by reaction with an epoxide group of the core radical. For example a primary diamine such as ethylene diamine can be reacted to form an anchor group having one secondary amine and one primary amine group.

Examples of preferred dispersants are those derived from triglycidyl isocyanurate and having the formula:

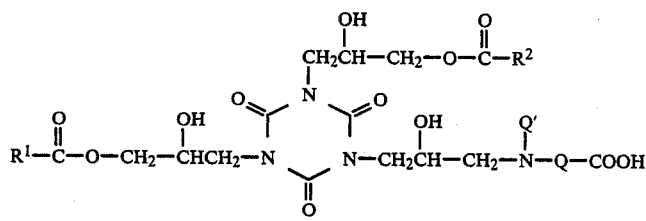

where $R^1$ and $R^2$ are solvent-compatible radicals, which may be the same or different, as defined above, Q is a divalent organic group which preferably comprises an aromatic ring and Q' is hydrogen or a monovalent organic group; or the formula:

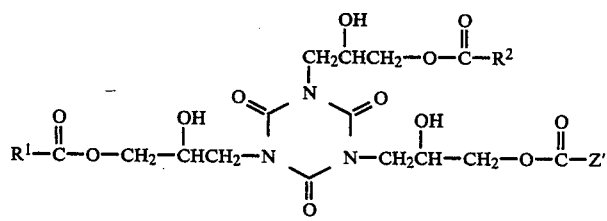

where $R^1$ and $R^2$ have the above meanings and Z' is an aryl or aralkyl group ring-substituted by at least one nitro group.

The average molecular weight of the dispersant is preferably 1200–20000, most preferably 2000–10000.

The dispersant of the invention can be used with a wide range of pigments, solvents and film-forming resins. It can be used to disperse inorganic pigments and fillers such as titanium dioxide, zinc phosphate, barytes, red and yellow iron oxides, scarlet chrome and chrome yellow in solvents such as aliphatic hydrocarbons, for example white spirit, aromatic hydrocarbons, for example xylene, trimethylbenzene or toluene, ketones such as methyl isobutyl ketone, esters such as butyl acetate, alcohols such as butanol and ether alcohols such as 1-methoxy-2-propanol. The dispersant can also be used to disperse organic pigments such as phthalocyanine, azo, anthraquinone, thioindigo, isodibenzanthrone, triphendioxane or cuinacridone pigments, vat dye pigments or lakes of acid, basic or mordant dyestuffs in the above solvents. When dispersing organic pigments, dispersants according to the invention are preferably used in conjuction with auxiliary dispersants of the type in which a radical of an organic pigment such as a phthalocyanine or azo pigment is bonded to a solvent-compatible radical. Examples of such auxiliary dispersants are sold under the Trade Marks Solsperse 5000 and Solsperse 22000.

The amount of dispersant used to prepare a pigment dispersion varies with the pigment to be dispersed but is preferably in the range 3–12 percent by weight of the dispersion. For example a dispersion comprising 6 percent by weight of a dispersant according to the invention, 70–75 percent by weight of an inorganic pigment such as titanium dioxide or yellow iron oxide and 19–24 percent by weight of an aromatic solvent such as trimethylbenzene is a stable dispersion which flows easily, as is a dispersion comprising 9 percent by weight of a dispersant according to the invention, 3 percent of an auxiliary dispersant as described above, 40 percent of an organic pigment such as phthalocyanine blue and 48 percent of an aromatic solvent.

Dispersants according to British Pat. Nos. 1373660 and 1342746 such as the dispersant sold commercially under the Trade Mark 'Solsperse 17000' have similar dispersing power to the dispersants of the invention but have the disadvantage that they reduce the adhesion to substrates of paints containing them. Paints containing the dispersants of the invention have improved adhesion compared to paints containing such prior art dispersants, both to substrates such as metals and primer paints and to subsequently applied coats of paint.

By comparison a commercially available dispersant based on an isobornyl methacrylate polymer according to U.S. Pat. No. 3,940,353, such as that sold under Trade Mark 'DM 55', in many cases cannot achieve such a high pigment concentration in the dispersion and in any case needs to be used in substantially greater amounts to produce a stable fluid pigment dispersion containing the same pigment concentration. This leads to a relatively high concentration of dispersant in the paint film, which can reduce the properties of the paint film, particularly for high performance paints such as corrosion-resistant, weathering-resistant and chemically resistant paints. Pigment dispersants according to the invention in which at least one of the solvent-compatible radicals R comprises an acrylic polymer containing alicyclic groups, for example an isobornyl acrylate or methacrylate polymer, are compatible with as wide a range of film-forming resins and solvents as such prior art dispersants and are effective at much lower concentrations.

Pigment dispersions using the dispersant of the invention can be mixed with a wide range of film-forming resins, for example alkyd resins, oleoresins, chlorinated rubbers, acrylic polymers, polyesters, polyamides, vinyl resins, urethane resins including urethane alkyds, epoxy resins, styrenated alkyds or nitrocellulose in solution in an organic solvent to form a stable paint. The dispersant gives good resistance to flocculation upon mixing of the pigment dispersion with a film-forming resin solution. Paints containing pigment dispersions according to the invention can be mixed with curing agents such as melamine resins, polyisocyanates, and epoxy resins for use in stoving paints or two-pack paints without deleterious effect.

The dispersant can alternatively be mixed with the resin solution and pigment to produce a paint with a greatly reduced grinding time, for example 2 to 8 hours compared to more than a day. In either case the paint has improved tinctorial strength.

The dispersants of the invention can also be used to disperse pigments in printing inks or to disperse dyestuffs for use in disperse dyeing. The dispersants of the invention can also be used in the colouring of plastics materials, for example by forming a pigment dispersion in an organic liquid such as a plasticiser which is subsequently compounded with the plastics material. Examples of plastics materials which can be so coloured include polyvinyl chloride, polypropylene and polyesters. Examples of liquid plasticisers which can be used in the dispersion medium are ester plasticisers such as phthalate diesters, e.g. dioctyl phthalate, and liquid hydrocarbon polymers such as low molecular weight polybutene.

MODES FOR CARRYING OUT THE INVENTION

The invention is illustrated by the following examples in which parts and percentages are by weight:

EXAMPLE 1

Reaction A

A mixture of 22.5 parts of trimethyl benzene ("Solvesso 100") and 50 parts of a commercial grade of 12-hydroxystearic acid having minimum acid and hydroxyl values of 175 and 150 respectively was heated to 100° C. under nitrogen and 0.1 part of methane sulphonic acid added. The temperature was then held at between 130° and 140° C. for 8 hours with sufficient vacuum applied to enable collection of the water formed during the reaction in a Dean and Stark separator. The resulting polyester had an acid value of 36.2 mg/KOH/g non-volatiles and was pale brown in colour.

Reaction B 0.23 parts dimethyl lauryl amine and 4.62 parts of tri-glycidyl isocyanurate were added to the polyester solution of reaction A and heated for 8 hours under nitrogen at 140° C. The resulting solution had an acid value of 0.46.

Reaction C 2.1 parts of 4-aminobenzoic acid were added to the solution produced in reaction B and heated for 8 hours at 140° C. under nitrogen. The resulting solution was then diluted to 60 percent solids with trimethyl benzene and filtered through Celite filter aid. The final product had an acid value of 9.4.

Pigment Dispersion A 10 parts of the dispersing agent solution produced in Reaction C was diluted with 15 parts of trimethyl benzene and 75 parts of titanium dioxide was added under high speed stirring. The resulting dispersion was of low viscosity and well deflocculated.

Pigment Dispersion B 15 parts of the dispersing agent solution produced in Reaction C was diluted with 42 parts trimethyl benzene. 3 parts of Solsperse 5000 (an auxiliary dispersant based on a modified pigment) and 40 parts phthalocyanine blue were then added and the mixture was passed through a bead mill to reduce the particle size of the pigment. The resulting dispersion was of low viscosity and well deflocculated.

PAINT PREPARATION 30 parts of pigment dispersion A and 10 parts of pigment dispersion B were briefly stirred with 60 parts of a 60 percent solution of an air-drying alkyd resin in white spirit giving a paint without flocculation.

Paints could similarly be prepared without flocculation using a short oil alkyd or a long oil alkyd as the film-forming resin.

COMPARATIVE EXPERIMENT

Two pigment dispersions A' and B' and a paint based on an air-drying alkyd resin were prepared as described above, but using the commercial dispersant "Solsperse 17000" in place of the dispersant of the invention. The dispersions prepared had the same low viscosity and there was little flocculation on mixing with the resin solution.

Both paints were applied to steel panels and were allowed to dry. When the paints were dry a cross-hatch adhesion test was carried out. The paint films were scored through to metal in a pattern of 10×10 scribes 3 mm apart and "Scotchtape 610" adhesive tape was applied. The paint containing the dispersant of the invention rated 100 (that is, none of the squares of the paint were removed by the adhesive tape). The paint containing "Solsperse 17000" rated 0 (that is, all the squares of paint were removed by the adhesive tape).

EXAMPLE 2

3.2 parts of 3,5-dinitrobenzoic acid were added to the solution produced in Reaction B of Example 1 and heated for 8 hours at 140° C. under nitrogen. The resulting solution was diluted to 60 percent solids with trimethyl benzene and filtered through Celite filter aid. The final product had a acid value of 0.9.

The dispersing agent solution produced could be used to produce pigment dispersions and paints in the same way as the product of Example 1.

EXAMPLE 3

Poly(12-hydroxystearic acid) was reacted with triglycidyl isocyanurate as described in Reactions A and B of Example 1 to produce a product having an acid value of 0.5 and an average of 2 polyhydroxystearic acid chains attached to each triglycidyl isocyanurate molecule by ester linkages. This was obtained as a 70 percent solution in trimethylbenzene (intermediate 1).

Intermediate 1 was reacted with ethylene diamine at a molar ratio of 1:1 for 30 minutes at a 120° C. to produce a dispersant having the anchor group:

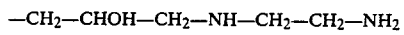

attached to the remaining nitrogen atom of the isocyanurate ring.

15 parts of the dispersing agent solution produced above was diluted with 42 parts trimethylbenzene. 3 parts of Solsperse 22000 (an auxiliary dispersant based on a modified pigment) and 40 parts "Pigment Yellow G", an organic yellow pigment, were then added and the mixture was bead milled. The resulting dispersion was of low viscosity and well deflocculated. 40 parts of the pigment dispersion was briefly stirred with 60 parts of a 60 percent solution of a short oil alkyd resin in white spirit giving a paint without flocculation.

EXAMPLE 4

Intermediate 1 of Example 3 was reacted with adipic acid at a 1:1 molar ratio for 2 hours at 140° C. to produce a dispersant solution having an acid value of 20. The dispersant had the anchor group:

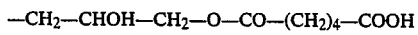

attached to the remaining nitrogen atom of the isocyanurate ring. This dispersant containing a free carboxylic acid group could be used as such or could be converted into an alkali metal, ammonium or amine salt.

EXAMPLE 5

Part of the dispersant solution produced in Example 4 was reacted with an equimolar amount of n-butylamine at 140° C. for 30 minutes with removal of water formed during the reaction to produce the N-n-butylamide of the dispersant of Example 4.

EXAMPLE 6

Intermediate 1 from Example 3 was reacted with taurine at a molar ratio of 1:1 for two hours at 140° C. to produce a solution of a dispersant having anchor groups of the formula:

Pigment dispersions and paints were produced using the dispersants of Example 4 (both in free acid and in ammonium salt form), 5 and 6 in place of the dispersant of Example 3 in the formulation of Example 3. Low viscosity pigment dispersions were produced from each dispersant and none of them gave any flocculation on mixing with the alkyd resin solution.

EXAMPLE 7

100 g Terathane 1000 (Trade Mark) polytetramethylene glycol of molecular weight about 1000 was melted at 100° C. 15 g phthalic anhydride and 0.75 g N,N-dimethyl lauryl amine catalyst were dissolved in the melt and heated to 150° C. for 30 minutes to produce a carboxyl tipped polyether of the formula:

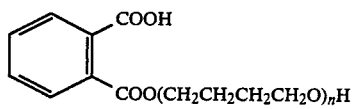

where n has an average value of about 13.

Methoxypropanol was added to the product at 150° C. to give a 60 percent solution. 14.5 g triglycidyl isocyanurate was added to the solution and reacted at 150° C. until the acid value dropped to 0.5. 6.5 g p-aminobenzoic acid was added and reacted at 150° C. for 30 minutes. The solvent was removed by vaccum distillation and the product was redissolved in Solvesso 100 to give a 60 percent solution.

Pigment dispersions of 4 different pigments were prepared from this dispersant solution. The composition of the pigment dispersions and their method of preparation is shown in Table 1. In all cases a well dispersed fluid dispersion was achieved. The pigment dispersions were stirred into 3 different paint bases, namely an alkyd resin base, an epoxy resin base and a polyurethane base. All the paint bases comprised a 60 percent solution of the paint resin pigmented with 22.5 percent white titanium dioxide pigment. The ratio of the mixing of the paint base and pigment dispersion was 9:1 by volume for the inorganic yellow, inorganic white and organic blue pigments and 8:2 by volume for the organic yellow pigment. The presence or absence of flocculation during mixing was noted in each case. The paint produced was painted on a metal coupon to observe its gloss. The results are quoted in Table 1.

TABLE 1

| Formulation of pigment dispersion | Type of Milling used | Let down with white alkyd | Let down with white epoxy | Let down with white polyurethane (Pu) |
|---|---|---|---|---|
| Inorganic Yellow B553 Pigment 70% Dispersant 4.4% Solvesso 100-25.6% | High Speed Disperser. 10 mins | Some flocculation Fair gloss. | Good gloss. No apparent flocculation | Very good gloss. No apparent flocculation. |
| Inorganic White TiO2 Pigment 70% Dispersant 4.4% Solvesso 100-25.6% | High Speed Disperser. 10 mins | Some flocculation. Fair gloss. | Good gloss. No apparent flocculation | Very good gloss. No apparent flocculation. |
| Organic Yellow YY44 Pigment 35% Dispersant 3.2% 'Solsperse 22000' auxiliary dispersant 1.1% Solvesso 100-60.7% | Mini Bead Mill. 10 mins. 4000 RPM | Some flocculation. Fair gloss. | Good gloss. No apparent flocculation | Very good gloss. No apparent flocculation |
| Organic Blue YB39 Pigment 40% Dispersant 3.8% 'Solsperse 5000' auxiliary dispersant 1.8% Solvesso 100-54.4% | Mini Bead Mill. 10 mins. 4000 RPM | Some flocculation. Fair gloss. | Good gloss. No apparent flocculation | Very good gloss. No apparent flocculation. |

The degree of gloss achieved in the alkyd resin paints, although satisfactory, was not as good as that achieved in alkyd resin paints using the dispersant of Example 1 or using the commercial dispersant "Solsperse 17000". The gloss and freedom from flocculation in epoxy resin paints, however, were at least as good as that achieved using the dispersants of Example 1 or Solsperse 17000, and the gloss and absence of flocculation in the polyurethane paint were considerably better.

EXAMPLE 8

A dispersant was prepared using the process of Example 7 from a polytetramethylene glycol polyether of molecular weight 650 sold commercially under the Trade Mark "Teracol 650". The amounts of reagents used in preparing the dispersant were as follows:

| | |
|---|---|
| Teracol 650 | 130 g |
| Phthalic anhydride | 29.6 g |
| Dimethyl lauryl amine catalyst | 1.48 g |
| Triglycidyl isocyanurate | 29.7 g |
| p-aminobenzoic acid | 27.4 g |

Pigment dispersions having the formulations shown in Table 1 were prepared but using the dispersants of Example 8 in place of that of Example 7. Fluid dispersions were achieved in all cases. The pigment dispersions were let down into alkyd, epoxy and polyurethane paints as described in Example 7. No flocculation was observed in any preparation. The alkyd paints had a good gloss similar to that obtained using the dispersant of Example 1. The epoxy paints also had a good gloss although they were slightly less glossy than paints using the dispersants of Examples 1 and 7. The polyurethane paints, although they could be prepared without flocculation, did not have a good gloss.

EXAMPLE 9

57.4 g of the carboxyl tipped polyether produced from "Terathane 1000" and phthalic anhydride in Example 7 and 85.5 g poly(12-hydroxy stearic acid) as used in Example 1 were dissolved together at 60 per cent in methoxy propanol at 150° C. 14.85 g triglycidyl isocyanurate was added and reacted at 150° C. until the acid value dropped to 0.5. 6.85 g p-amino benzoic acid was then added and reacted at 150° C. for 30 minutes. The dispersant produced was redissolved in Solvesso 100 as described in Example 7 to give a 60 per cent solution.

Pigment dispersions were prepared as described in Table 1 but using the dispersants of Example 9 in place of that of Example 7. Fluid dispersions were obtained in each case. The pigment dispersions were let down into alkyd, epoxy and polyurethane paints as described in Example 7. No flocculation was observed in any preparation. The alkyd and epoxy paints had a good gloss, substantially equal to paints prepared using the dispersants of Example 1 and of Example 8. The polyurethane paints also had a fairly good gloss; they were not as glossy as the polyurethane paints prepared in Example 7 but were much better than the polyurethane paints prepared using the dispersant of Example 1 or "Solsperse 17000".

EXAMPLE 10

Ricinoleic acid (300 g), trimethyl benzene (75 g) and Fascat 4101 (3 g) (butyl chloro tin dihydroxide catalyst) were charged to a reaction vessel, set up for reflux, fitted with a Dean-Stark trap. The mixture was heated under reflux for 10.5 hours. The final acid value of the polyricinoleic acid solution produced was 33.9.

250 g of the above solution was heated to 130° C. under reflux then dimethyl lauryl amine (1.1 g) and triglycidyl isocyanurate (22.4 g) were added. When the acid value of the solution had fallen to 0.3, p-aminobenzoic acid (10.35 g) was added and the temperature maintained at 110°–115° C. for 30 minutes.

The dispersing agent produced was evaluated in the formulation below:

| | |
|---|---|
| Organic Pigment Yellow G | 35% |
| Dispersing Agent | 6% |
| Solsperse 22000 auxiliary dispersant | 3% |
| Trimethyl benzene | 56% |

The mixture was milled for 5 minutes at 5,000 r.p.m on a bead mill and the resulting dispersions let down into white alkyd paint. (20 parts dispersion:80 white alkyd). There was no flocculation. The colour strength and gloss of the paint produced was equal to that produced using the dispersant of Example 1 or "Solsperse 17000".

The effect of Solsperse 17000 and the dispersant of Example 10 on the adhesion of air drying alkyds was tested. 4% dispersant (based on resin) was added to each resin solution (60% resin in white spirit), then the solutions were cast onto steel panels and stoved for 30 minutes at 120° C. A cross-hatch adhesion test was carried out as described in Example 1; the results were as follows:

| Dispersing Agent | Long Oil Alkyd | Fast Air Drying Alkyd |
|---|---|---|
| Solsperse 17000 | 0 | 5 |
| Dispersant of Example 10 | 80 | 99 |

EXAMPLE 11

Pripol 1010 (Trade Mark) dimer acid (a fatty acid dimer) (300 g), neopentyl glycol (54.9 g), octanoic acid (25.8 g), toluene (60 cm³) and methane sulphonic acid (0.38 g) were heated under reflux in a reaction vessel fitted with a Dean-Stark trap. After 3.5 hours the acid value had fallen to 26.1, and the toluene was removed by vacuum distillation.

The polyester produced was dissolved in 200 cm³ of 4:1 vol/vol methoxypropanol-trimethylbenzene and the solution heated to 90° C. 2 g dimethyl lauryl amine was added followed by 24.9 g triglycidyl isocyanurate and the temperature raised to 120° C. This temperature was maintained until the acid value of the solution had fallen to 0.43. p-Aminobenzoic acid (11.5 g) was then added. The reaction was allowed to continue at 120° C. for a further 45 minutes prior to removing the solvent by vacuum distillation.

The dispersant produced could be used in the same manner as the dispersant of Example 10.

EXAMPLE 12

Butyl acetate (200 g) was heated to 90° C. in a 1 liter flanged reaction vessel. The monomer solution comprising butyl acetate (100 g), ethanol (2.6 g), mercaptoacetic acid (14 g), 4,4' azobis(4-cyanovaleric acid) (3 g), and isobornyl methacrylate (318.2 g). This solution was added to the reaction vessel over a period of 8 minutes, then the temperature maintained at 90° C. for 4 hours. The solvent was then removed by vacuum distillation. GPC indicated a peak m.wt, of 2000 relative to polystyrene calibration standards.

250 g of the product was dissolved in methoxypropanol (167 g) and heated to 90° C. prior to adding dimethyl lauryl amine (0.92 g) followed by triglycidyl isocyanurate (18.5 g). The temperature was then increased to 120° C., and this temperature maintained until the acid value of the solution had fallen to 0.4. p-Aminobenzoic acid was then added. After 30 minutes at 120° C. the solvent was removed by vacuum distillation.

The dispersing agent was evaluated by preparing a dispersion of Pigment Yellow 'G', using the dispersing agent in conjunction with Solsperse 22000. The dispersion was then added to white alkyd, polyurethane and epoxy paints; films were cast and showed no significant flocculation.

The films had good gloss in alkyd, polyurethane and epoxy systems.

EXAMPLE 13

A monomer solution comprising isobornyl acrylate (594 g), ethyl acetate (150 g), butyl acetate (150 g), ethanol (10 g), mercaptoacetic acid (28 g) and 4 4'azobis (4-cyanovaleric acid) (6 g) was added over a period of one hour to ethyl acetate (150 g) and butyl acetate (150 g) in a flanged reaction vessel. The temperature was kept between 85°–93° C. during the addition. The polymerisation was allowed to continue for a further 4 hours prior to removing the solvent by vacuum distillation. GPC of the polymer gave a peak M.wt. of 2,000 relative to polystyrene calibration standard.

Methoxypropanol (400 g) was added to the polymer and the mixture warmed to dissolve the polymer, then heated to 90° C. Dimethyl lauryl amine (2.6 g), then triglycidyl isocyanurate (51.7 g), were added, and the temperature increased to 120° C. This temperature was maintained until the acid value of the solution had fallen to 0.5. p-Aminobenzoic acid (23.8 g) was added. After 30 minutes the solution was allowed to cool and filtered and the solvent was removed by vacuum distillation. GPC of the product gave peak m.wt. of 4,000 relative to a polystyrene standard.

The dispersant was evaluated as described in Example 12 and produced a pigment dispersion having the same good compatibility with alkyd, polyurethane and epoxy points.

EXAMPLES 14 TO 16

3 further dispersants containing acrylic polymer chains were prepared using the process of Example 13. The formulations used in the first stage to prepare the carboxy functional acrylic polymer were as follows:

|  | Example 14 | Example 15 | Example 16 |
| --- | --- | --- | --- |
| 2-Ethylhexyl Acrylate | — | — | 500.0 g |
| Isobornyl Methacrylate | 50.0 g | 750.0 g | — |
| Methyl Methacrylate | 150.0 g | 750.0 g | — |
| Butyl Acetate | 260.0 g | 1,950.0 g | 500.0 g |
| 4 4'Azobis (4-Cyanovaleric Acid) | 2.0 g | 15.0 g | 5.0 g |
| Mercaptoacetic Acid | 9.3 g | 69.0 g | 20.0 g |
| Ethanol | 5.3 g | 30.0 g | 5.0 g |

The acrylic polymers were then each reacted with triglycidyl isocyanurate, followed by reaction of the product with p-aminobenzoic acid in the proportions set out below:

|  | Example 14 | Example 15 | Example 16 |
| --- | --- | --- | --- |
| Methoxypropanol | 134.0 g | 1,000.0 g | 300.0 g |
| Dimethyl lauryl Amine | 0.85 g | 6.3 g | 1.9 g |
| Triglycidyl Isocyanurate | 16.9 g | 127.5 g | 37.4 g |
| p-Aminobenzoic | 7.8 g | 58.8 g | 17.3 g |

The dispersants were each used to prepare a fluid dispersion of pigment yellow G as described in Example 12. The pigment dispersions were let down in alkyd, polyurethane and epoxy paints. The dispersions of Examples 14 and 15 showed good compatibility with all 3 types of paint and formed glossy paint films in each case. The dispersion of Example 16 showed good compatibility with alkyd and epoxy paints but there were some flocculation when it was added to the polyurethane paint base and films formed from the resulting paint were not as glossy as those produced in Examples 12 to 15.

We claim:

1. A compound suitable for use as a dispersant for a pigment in an organic solvent, said compound being selected from the group consisting of (a) compounds of the formula

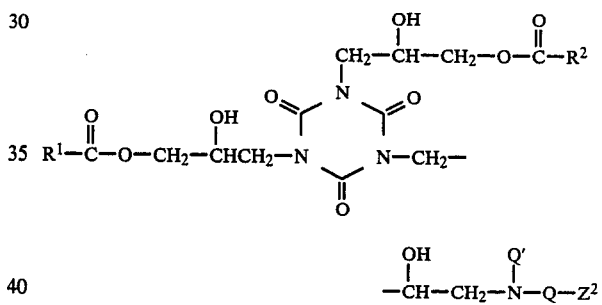

wherein $R^1$ and $R^2$ are solvent-compatible organic radicals of molecular weight at least 200 which are the same or different, the average molecular weight of the solvent-compatible radicals $R^1$ and $R^2$ being at least 500. Q is a divalent organic group, $Q^1$ is hydrogen or a monovalent organic group and $Z^2$ is a polar group,

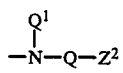

being a pigment-compatible radical, and (b) compounds of the formula

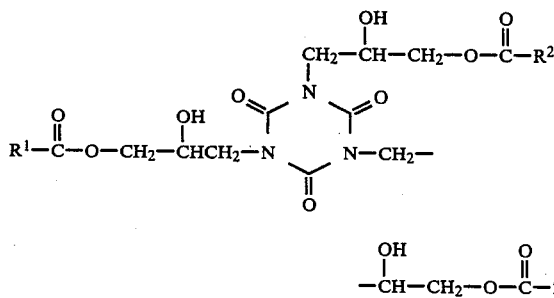

where $R^1$ and $R^2$ are hereinabove defined and Z is a pigment-compatible radical containing a polar group.

2. A compound as claimed in claim 1 wherein the polar group is selected from the group consisting of amino, carboxylic acid, carboxylic acid salt with an alkali metal or amine, and nitro.

3. A compound according to claim 1 wherein the solvent-compatible radicals comprise polyester radicals of molecular weight 1000 to 3000.

4. A compound according to claim 3, wherein polyester radicals are poly(12-hydroxystearic acid) radicals.

5. A compound having the formula:

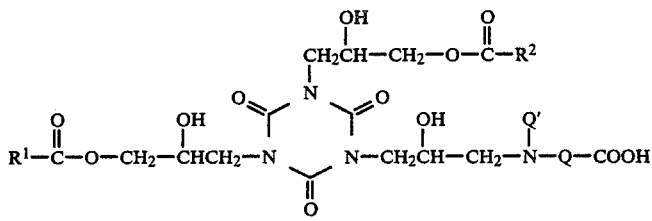

where $R^1$ and $R^2$ are solvent-compatible organic radicals of molecular weight at least 200 which are the same or different, the average molecular weight of the solvent-compatible radicals $R^1$ and $R^2$ being at least 500, Q is a divalent organic group and Q' is hydrogen or a monovalent organic group.

6. A compound having the formula:

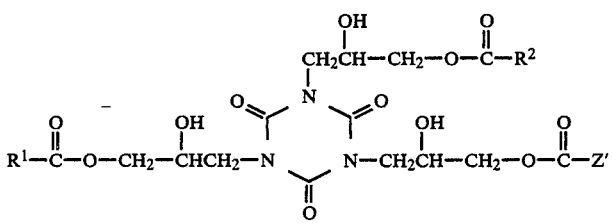

where $R^1$ and $R^2$ are solvent-compatible organic radicals of molecular weight at least 200 which are the same or different, the average molecular weight of the solvent-compatible radicals $R^1$ and $R^2$ being at least 500, and Z' is an aryl or aralkyl group ring-substituted by at least one nitro group.

7. The compound according to claim 1 wherein said pigment-compatible radicals are amino groups which are attached to an aromatic ring.

8. The compound according to claim 7 wherein said pigment-compatible radical is a p-aminobenzoic acid radical and the core radical is a radical of triglycidyl isocyanurate.

9. The compound according to claim 1 wherein at least one of said solvent-compatible radicals comprises a polyether radical having a molecular weight of 1000 to 3000.

10. The compound according to claim 1 wherein said at least one solvent-compatible radical includes a poly(12-hydroxystearic acid) radical.

* * * * *